Patented Apr. 16, 1935

1,998,182

UNITED STATES PATENT OFFICE 1,998,182

PRODUCTION OF DI-SODIUM PHOSPHATE

Francis M. Anable, Chicago Heights, and George Klein, Chicago, Ill., assignors to Victor Chemical Works, a corporation of Illinois No Drawing. Application July 16, 1932, Serial No. 623,008

17 Claims. (Cl. 23—107)

This invention relates to a method of preparing pure anhydrous di-sodium phosphate.

In preparing anhydrous di-sodium phosphate from phosphoric acid and sodium carbonate and/or some other alkaline sodium compound such as caustic soda or tri-sodium phosphate, the ordinary steps of filtration plus evaporation to dryness, following the neutralization reaction, no not result in a di-sodium phosphate which will produce an entirely clear water solution. This is due chiefly to impurities such as silica and iron and aluminum compounds which are water insoluble in the final product, but which are not precipitated and removed by the preceding filtration.

According to the present invention a substantially pure di-sodium phosphate may be prepared from phosphoric acid, preferably concentrated phosphoric acid such as is produced by a volatilization process, for example, by the blast furnace or electric furnace methods, by carefully controlling the conditions at the end point of the reaction and then maintaining the solution under such conditions until the impurities have precipitated out. For example, concentrated phosphoric acid is mixed with soda ash or caustic soda or both, and water added, if necessary, sufficient to produce a Bé. gravity of preferably 52-54° (as measured at 80° C.). It is preferred to use soda ash for the first part of the neutralization and caustic soda or tri-sodium phosphate for the final neutralization.

For example, 7094 lbs. 75% phosphoric acid
    5400 lbs. soda ash
      340 lbs. caustic soda, or
    2400 lbs. tri-sodium phosphate give a solution of the proper proportions.

The pH of the mixture is adjusted so that the pH of a diluted sample will be approximately 8.90, say from 8.85 to 9.00, preferably 8.85 to 8.95, when measured after diluting 10 cc. of the 52–54° Bé. solution with 50 cc. of water where the original solution has a higher or lower concentration, the dilution is varied to give the same ultimate concentration. The reaction mixture is then heated, preferably to 100° C. or above, and agitated until a test of the filtered solution shows no trace of iron or aluminum impurities, for example, as shown by the ammonium acetate test. It is evident that in the above process the phosphoric acid may be replaced by mono-sodium phosphate.

Precipitation of the impurities is rendered more rapid by increase in temperature, and it is, therefore, preferred to boil the solution in order to save time. However, at lower temperatures complete elimination of the impurities may be secured by allowing a longer period for precipitation.

For example, a 52° Bé. solution (as measured at 80° C.) showed complete absence of iron and aluminum after two hours of boiling (106° C.). A similar solution agitated at 100° C. required approximately six hours for complete removal of the impurities. It is preferred to agitate the solution in order to hasten the precipitation.

Diminution in the gravity of the solution below 52–54° Bé. results in a decrease in the rate of precipitation. For example, solutions treated under identical conditions as to pH showed a freedom from iron and aluminum impurities after two hours of boiling where the Bé. gravity was 53°, whereas a solution having a Bé. gravity of 43.5° still showed traces of impurities after nine hours of boiling. Solutions having a Bé. gravity below 40° (as measured at 80° C.) do not appear to completely precipitate impurities when treated by this method.

After a sample filtrate shows no iron or aluminum upon test, the impurities may be removed from the main body of liquid, for example, by filtering, and the solution then evaporated to dryness in the desired manner, as, for example, spray or film drying of any type.

A further improvement may be accomplished by the use of tri-sodium phosphate for the final neutralization of the phosphoric acid. It has been discovered that by using tri-sodium phosphate instead of caustic soda, the silica remaining in the di-sodium phosphate is practically all in soluble form, whereas with caustic soda a considerably greater portion of the silica appears in the final product in insoluble form.

A water solution of di-sodium phosphate produced in the above manner is practically perfect, the amount of insoluble material being in the neighborhood of .002 to .01%, and consisting essentially of hydrated silica. By proceeding in accordance with this invention, it has been discovered that practically all of the silica in the final product is rendered soluble.

The foregoing detailed description has been given for clearness of understanding only, and no unnecessary limitations should be understood therefrom, but the appended claims should be construed as broadly as permissible, in view of the prior art.

We claim:

1. The method of purifying di-sodium phosphate containing iron and aluminum impurities which comprises producing a solution comprising di-sodium phosphate of a Bé. gravity in excess of 40° as measured at 80° C., maintaining a pH therein such that on dilution of a sample to a dilution corresponding to the addition of 5 parts of water to a 52°–54° Baumé solution, the diluted sample has a pH of 8.85–9.00, heating the solution until said iron and aluminum impurities are completely precipitated, removing said solution from said precipitated impurities, and removing the di-sodium phosphate from said solution.

2. The method as set forth in claim 1, in which the pH of the sample is approximately 8.9.

3. The method as set forth in claim 1, in which said solution is maintained at a Bé. gravity of 52–54°.

4. The method as set forth in claim 1, in which the solution is agitated.

5. The method as set forth in claim 1, in which the solution is heated to a temperature not substantially less than 100° C.

6. The method as set forth in claim 1, in which the solution is boiled.

7. The method of purifying iron and aluminum-containing di-sodium phosphate produced by the use of phosphoric acid made by a volatilization process which comprises producing a solution comprising di-sodium phosphate of a Bé. gravity in excess of 40° as measured at 80° C., maintaining a pH therein such that on dilution of a sample to a dilution corresponding to the addition of 5 parts of water to a 52°–54° Baumé solution, the diluted sample has a pH of 8.85–9.00, heating the solution until said iron and aluminum impurities are completely precipitated, removing said solution from said precipitated impurities and removing the purified di-sodium phosphate from said solution.

8. The method as set forth in claim 7, in which the pH of the sample is approximately 8.9.

9. The method as set forth in claim 7, in which said solution is maintained at a Bé. gravity of 52–54°.

10. The method as set forth in claim 7, in which the solution is agitated.

11. The method as set forth in claim 7, in which the solution is heated to a temperature not substantially less than 100° C.

12. The method as set forth in claim 7, in which said solution is boiled.

13. The method of producing a pure anhydrous di-sodium phosphate from components containing iron and aluminum impurities, which comprises: producing a solution comprising disodium phosphate of a Bé. gravity in excess of 40° as measured at 80° C., maintaining a pH therein such that on dilution of a sample to a dilution corresponding to the addition of 5 parts of water to a 52°–54° Baumé solution, the diluted sample has a pH of 8.85–9.00, heating the solution until said iron and aluminum impurities are completely precipitated, removing said solution from said precipitated impurities, and evaporating the water from said solution.

14. In the method of producing purified disodium phosphate which comprises producing a solution of disodium phosphate by reaction of an acid phosphate with an alkaline sodium compound and heating the completed reaction mixture at a Baumé gravity in excess of 40° as measured at 80° C. and at a pH, as measured after diluting the reaction mixture to a dilution equivalent to that obtained by diluting a 52°–54° Bé. solution with 5 parts of water, of 8.85–9.00, until the iron and aluminum impurities have been completely precipitated, the step which comprises completing the neutralization of the acid phosphate by the addition of trisodium phosphate.

15. The method as set forth in claim 14 in which the acid phosphate is first partially neutralized with sodium carbonate.

16. The method as set forth in claim 14 in which the acid phosphate is phosphoric acid.

17. The method as set forth in claim 14 in which the acid phosphate is phosphoric acid, and in which the phosphoric acid is preliminarily partly neutralized with sodium carbonate.

FRANCIS M. ANABLE.
GEORGE KLEIN.